United States Patent [19]

Forbush et al.

[11] Patent Number: 4,526,771
[45] Date of Patent: Jul. 2, 1985

[54] SULFUROUS ACID GENERATOR

[75] Inventors: Donald C. Forbush, Logan; Glen R. Seamon, Wellsville, both of Utah

[73] Assignee: International Environmental, Inc., Cody, Wyo.

[21] Appl. No.: 424,417

[22] Filed: Sep. 27, 1982

Related U.S. Application Data

[63] Continuation-in-part of Ser. No. 261,768, May 8, 1981, abandoned.

[51] Int. Cl.$^3$ .................... C01B 17/54; C01B 17/48
[52] U.S. Cl. .................... 423/543; 422/160; 423/539
[58] Field of Search ............ 423/539, 543; 422/160, 422/161

[56]     References Cited
U.S. PATENT DOCUMENTS

| | | | |
|---|---|---|---|
| 1,638,992 | 8/1927 | Gillett | 422/160 |
| 2,595,447 | 5/1952 | Braun | 423/543 |
| 2,822,245 | 2/1958 | Shipman et al. | 422/160 |
| 3,212,533 | 10/1965 | Cathala | 422/160 |
| 3,226,201 | 12/1965 | Harmon | 422/160 |
| 3,314,766 | 4/1967 | Mukherji | 422/160 |
| 3,337,989 | 8/1967 | Harmon | 422/161 |
| 3,627,134 | 12/1971 | Mattson | 210/192 |
| 3,907,510 | 9/1975 | Collins | 423/543 |
| 4,039,289 | 8/1977 | Collins et al. | 423/543 |

FOREIGN PATENT DOCUMENTS

| | | | |
|---|---|---|---|
| 1180690 | 6/1959 | France | 423/543 |
| 1535265 | 4/1967 | France | 423/543 |
| 939805 | 10/1963 | United Kingdom | 423/543 |
| 1030917 | 5/1966 | United Kingdom | 423/543 |

OTHER PUBLICATIONS

Cain et al., Low Capacity Sulfur Burner, Chemical & Metallurgical Engineering #10, Oct. 1939, pp. 637–639.
Harmon SO$_2$ Generators, Care and Maintenance.

Primary Examiner—Gary P. Straub
Attorney, Agent, or Firm—Jeffrey G. Sheldon

[57]     ABSTRACT

A highly efficient apparatus for burning sulfur to sulfur dioxide and generating sulfurous acid comprises a primary sulfur-burning chamber, a sulfur feed tank closely coupled to the primary chamber, a secondary sulfur-burning chamber, and an absorption tower. Air is introduced to the primary chamber under turbulent, high-velocity flow conditions. Gas passes through the secondary chamber under turbulent flow conditions. The apparatus is capable of converting sulfur to sulfur dioxide at a rate in excess of 25 pounds of sulfur per hour per square foot of surface area of the molten pool of sulfur in the primary chamber.

30 Claims, 7 Drawing Figures

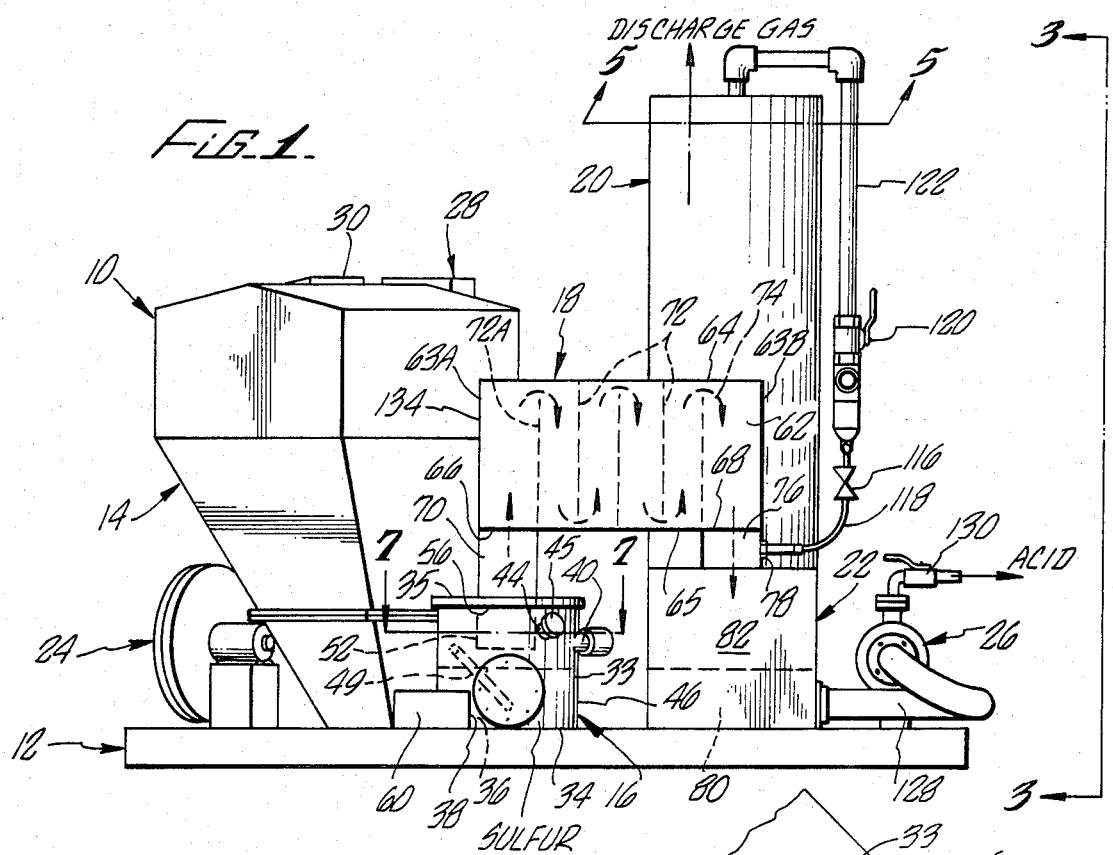
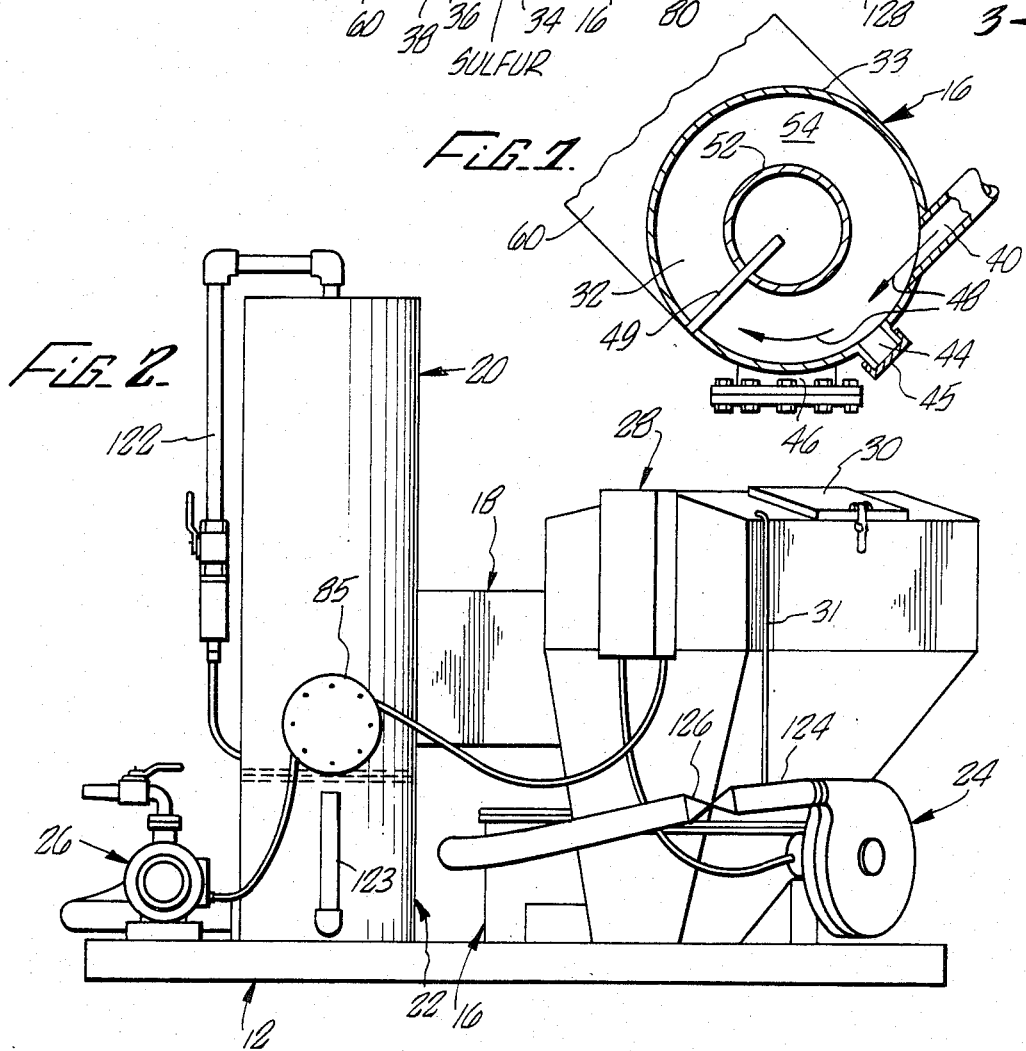

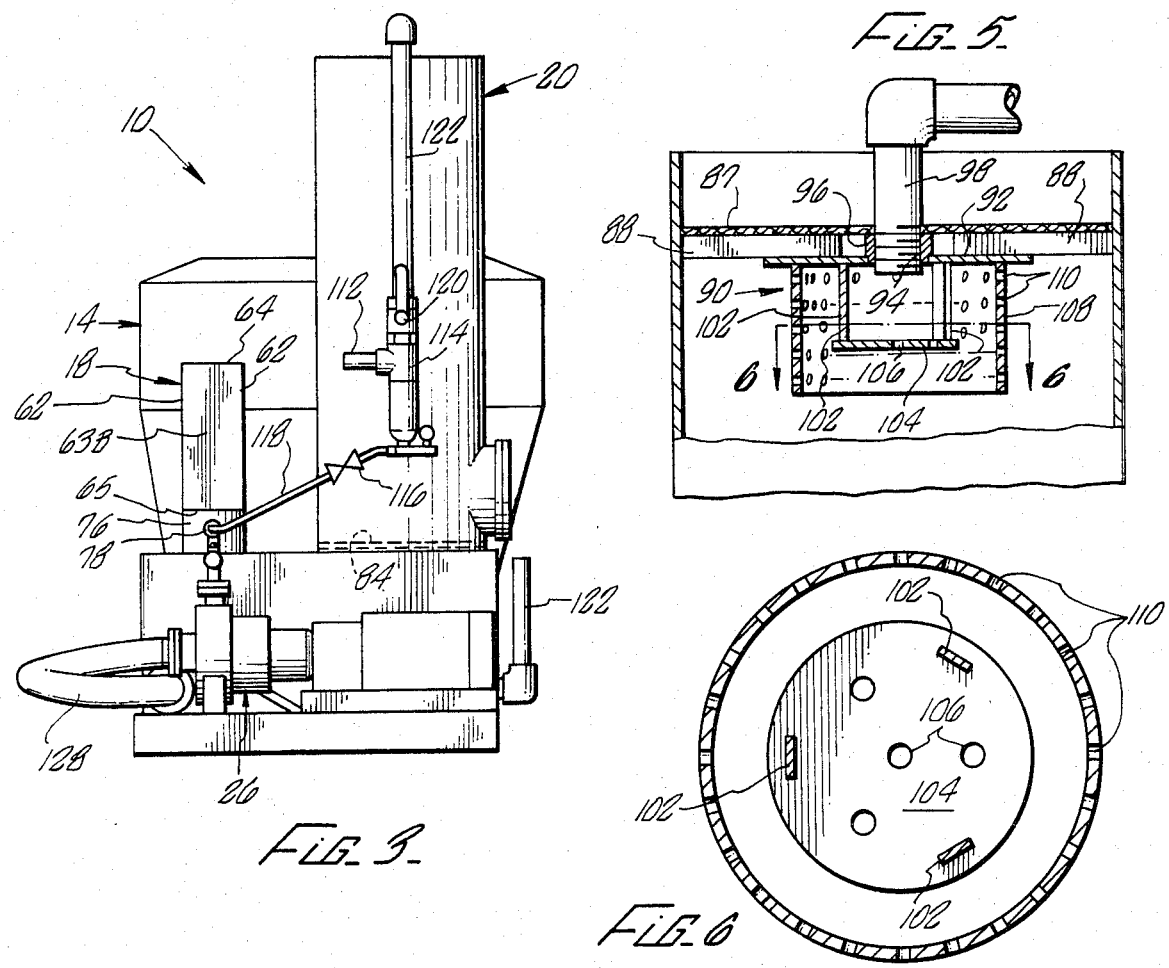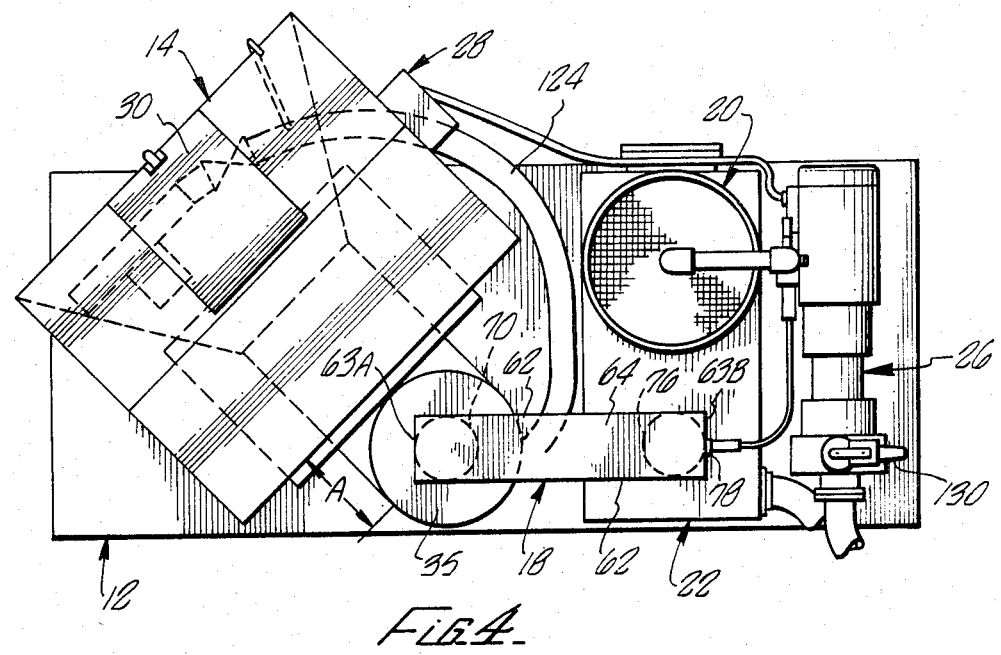

SULFUROUS ACID GENERATOR

CROSS-REFERENCE

This application is a continuation-in-part of application Ser. No. 261,768 filed on May 8, 1981 now abandoned, which is incorporated herein by this reference.

BACKGROUND

The present invention is directed to an apparatus for burning sulfur to sulfur dioxide, which sulfur dioxide can be used to generate sulfurous acid.

Attention has been directed to treating soil with sulfurous acid introduced into irrigation water for increasing crop yields. Although this can be accomplished by generating sulfur dioxide at a large central facility and transporting the sulfur dioxide to an individual farmer, it has been found that it is more efficient to generate the sulfur dioxide on site. This technique requires a small, but dependable, sulfur dioxide generator. Attempts to produce such a generator are described in U.S. Pat. Nos. 3,226,201; 3,337,989; 3,627,134; 3,907,510 and 4,039,289. A commercially available sulfur dioxide generator for farmers is available from D & J Harmon Company, Inc., of Bakersfield, Calif. A problem with these generators is that they are based upon conventional pan-burner technology. A limitation of pan burners is that the maximum burning rate is generally about 7 pounds of sulfur per hour per square foot of burning surface.

It is desirable to have a generator which is more efficient than the conventional pan burner. This would allow the farmer to generate substantially more sulfurous acid for treating soil with an apparatus of substantially the same size as prior art equipment.

SUMMARY

The present invention is directed to such a sulfurous acid generator. The apparatus comprises, as its primary components, a primary sulfur-burning chamber, a sulfur feed tank, a secondary sulfur-burning chamber, and an absorption tower. The primary sulfur-burning chamber comprises an enclosure adapted to have a pool of molten sulfur therein, a sulfur inlet at a first lower elevation, an oxygen-containing gas inlet at a second, relatively higher, elevation, and a gas outlet.

Preferably, the sulfur feed tank is closely coupled to the primary chamber to insure that molten sulfur is continuously provided to the sulfur pool. This close coupling can be accomplished with a short conduit between the sulfur feed tank and the sulfur inlet of the primary chamber, where the conduit has a cross-sectional area of from 15 to 80% of the surface area of the sulfur pool and a length less than the diameter of the pool.

The gas generated in the primary chamber contains sulfur, sulfur dioxide and unreacted oxygen. It is passed to the secondary chamber. The secondary chamber provides sufficient residence time and contains means such as baffles which cause the gas passing therethrough to undergo turbulent flow to insure that substantially all of the sulfur is converted to sulfur dioxide.

The absorption tower has a water inlet at its top and a gas inlet at its bottom for countercurrent flow of gas and water therein. There is a conduit between the gas inlet of the absorption tower and the outlet of the secondary chamber.

Preferably, the oxygen-containing gas inlet is oriented to introduce oxygen-containing gas to the primary chamber tangentially and at a high velocity of at least about 30 feet per second for forming a turbulent, cyclonic gas flow.

It has been found that the combination of the closely coupled sulfur feed tank and primary chamber, high velocity tangential introduction of oxygen-containing gas into the primary chamber, and a secondary chamber results in burn rates of at least 25 pounds of sulfur per hour per square foot of burning surface.

In the method of the present invention, a molten pool of sulfur is formed in a primary sulfur-burning chamber, molten sulfur is fed into the molten pool, and an oxygen-containing gas is introduced into the primary chamber under high-velocity, turbulent flow conditions for burning sulfur at the surface of the molten pool. This forms an effluent gas stream containing nitrogen, sulfur dioxide, and unreacted sulfur and oxygen. The effluent gas stream is passed to a turbulent-flow, secondary sulfur-burning chamber for combustion of substantially all of the sulfur in the effluent gas to sulfur dioxide. A gas containing sulfur dioxide is withdrawn from the secondary chamber and can be contacted with water to absorb sulfur dioxide into the water, thereby generating sulfurous acid.

DRAWINGS

These and other features, aspects, and advantages of the present invention will become better understood with reference to the following description, appended claims and accompanying drawings, where:

FIG. 1 is a front elevation view of an apparatus for generating sulfurous acid according to the present invention;

FIG. 2 is a rear elevation view of the apparatus of FIG. 1;

FIG. 3 is a side elevation view of the apparatus of FIG. 1 taken on line 3—3 of FIG. 1;

FIG. 4 is a top plan view of the apparatus of FIG. 1;

FIG. 5 is a sectional view of the absorption tower of the apparatus of FIG. 1 taken on line 5—5 of FIG. 1;

FIG. 6 is a view taken on line 6—6 of FIG. 5; and

FIG. 7 is a top sectional view of the primary sulfur-burning chamber of the apparatus of FIG. 1 taken on line 7—7 in FIG. 1.

DESCRIPTION

With reference to the figures, a sulfurous acid generating system 10 according to the present invention comprises as its principal elements an open grid support skid 12, a sulfur feed tank 14, a primary sulfur-burning chamber or zone 16, a secondary sulfur-burning chamber or zone 18, an absorption tower or zone 20, a sulfurous acid receiving tank 22, an air blower 24, a pump 26, and a control box 28. All the elements are supported and mounted on the skid 12 so that the entire unit can easily be transported such as on a flatbed truck. The elements can easily be disassembled for transport and replacement, as required.

The sulfur feed tank or hopper 14 is sized to hold in excess of a three-day supply of sulfur, but less than a four-day supply of sulfur. This insures that the owner of the generator 10 needs to check on its operation at least twice per week. The feed tank is self-feeding, i.e., no conveyor or vibrator is required to feed sulfur from the feed tank to the primary sulfur-burning chamber 16. As shown by FIGS. 1, 2, and 4, the wall of the sulfur feed tank 14 facing the primary sulfur-burning chamber 16 is flat, and the bottom portion of the wall of the sulfur feed tank 14 farthest from the primary sulfur-burning chamber 16 slopes inwardly toward the primary sulfur-burning chamber. The sulfur feed tank is shown in the figures diametrically opposite the location in which air is introduced into the primary sulfur-burning chamber.

The feed tank 14 has a pivotable top 30 and is made airtight to prevent escape of any gases generated in the primary sulfur-burning chamber 16. Also, by making the feed tank 14 airtight, passage of hot gas from the primary sulfur-burning chamber 16 into the feed tank 14 is minimized. Further, a line 31 extends from the blower discharge to the top of the feed tank (see FIG. 2) to maintain the pressure in the feed tank higher than or at least equal to the pressure in the primary chamber. This also prevents passage of hot gas into the feed tank 14. Passage of this hot gas is to be avoided to prevent excessive melting of sulfur in the feed tank 14 and to prevent exposure of operating personnel to sulfur dioxide when the top 30 is opened.

The primary sulfur-burning chamber 16 comprises a cylindrical enclosure 32 formed by a tubular side wall 33, a flat bottom wall 34, and a flat top wall 35. The primary chamber 16 is adapted to have a pool 36 of molten sulfur therein. The size of the bottom wall determines the surface area and diameter of the molten pool 36. As used herein, the term "burning surface" refers to the top surface of the pool 36. A sulfur inlet 38 is provided in the side wall 33 at a first elevation for feed of sulfur into the pool 36.

An oxygen-containing gas inlet 40 is provided at a second, relatively higher, elevation in the side wall 33 for introduction of an oxygen-containing gas into the enclosure 32. Preferably, the sulfur inlet 38 and the oxygen-containing gas inlet 40 are diametrically opposite each other. This is done so that incoming cool gas does not cool molten sulfur at the sulfur inlet 38 and so that the hottest portion of the primary chamber is adjacent the feed tank to melt incoming sulfur. It is important that the sulfur at the inlet 38 be maintained at a temperature higher than its melting point to maintain a constant feed of molten sulfur to the sulfur pool 36.

An access port 44 in the side wall with a cap 45 gives access to the inside of the primary chamber 16 to light sulfur therein. An electronic ignition device 49 having its own port can be used.

A covered cleanup port 46 is provided for cleaning out the primary chamber as necessary.

The gas inlet 40 is oriented to introduce oxygen-containing gas tangentially and horizontally, thereby creating a high-velocity, turbulent, cyclonic flow of oxygen-containing gas in the primary chamber 16. Contributing to this cyclonic flow of gas is a depending skirt 52 that depends to an elevation below the elevation of the oxygen-containing gas inlet. The incoming oxygen containing gas is displaced vertically by the skirt 52 before it can exit out the gas outlet 56. As shown in FIG. 7 the skirt forms a closed-at-its-top annular region 54 proximate to the oxygen-containing gas inlet. This cyclonic, turbulent flow of oxygen-containing gas is important in that it insures that any carbon-containing impurities that collect on the top of the sulfur pool are burnt off. The presence of impurities on the top of the sulfur pool interferes with the burning of the sulfur and decreases the capacity of the sulfurous acid generator 10.

A gas outlet 56 extends through the top wall 35. This is the only outlet for gas from the primary chamber 16.

A conduit 60 provides molten sulfur to the sulfur pool 36 from the base of the sulfur feed tank 14 via the sulfur inlet 38 of the primary chamber 16. Sulfur present in the conduit 60 is melted by the heat generated by the exothermic combustion of sulfur in the primary chamber 16. To maintain a steady flow of sulfur to the primary chamber, it is important that the feed tank 14 and the primary chamber 16 be closely coupled together. This is accomplished by sizing the conduit 60 so its length is less than the diameter of the burning surface, i.e., is less than the diameter of the primary chamber 16. For example, for a primary chamber 16 having a diameter of 15 inches, the maximum length of the conduit 60 (distance A in FIG. 4) preferably is about 10 inches long, i.e., less than about 70% of the diameter of the burning surface pool. Further, the conduit 60 preferably has a large cross-sectional flow area compared to the diameter of the sulfur pool. Preferably, the cross-sectional area of the conduit 60 is at least about 15%, and more preferably from 15 to 80%, of the surface area of the burning surface. The cross-sectional area of the conduit 60 can be from about 30 to about 40% of the surface area of the pool. For example, for a primary chamber having a diameter of 15 inches, a satisfactory conduit is one that is 5 inches tall and 15 inches wide, thus providing a cross-sectional area of about 40% of the surface area of the sulfur pool.

The secondary chamber 18 has the shape of an elongated box, having upstanding side walls 62, a first upstanding end wall 63A, second upstanding end wall 63B, a horizontal top wall 64, and a horizontal bottom wall 65. There is a gas inlet 66 in the bottom wall 65 adjacent the first end wall 63A and a gas outlet 68 in the bottom wall 65 adjacent the second end wall 63B. The gas inlet 66 is located vertically above and vertically spaced apart from the gas outlet 56 of the primary chamber 16 and connected thereto by a conduit 70.

The secondary chamber 18 is used for burning any unreacted sulfur present in the effluent gas from the primary chamber 16. For this purpose, it is important that the secondary chamber provides sufficient residence time for burning of the sulfur and at the same time provides adequate mixing of the gases passing therethrough to bring unoxidized sulfur into contact with oxygen. To provide adequate residence time in the secondary chamber, the ratio of the volume of the secondary chamber in cubic feet to the surface area of the sulfur pool in square feet is at least about 1, preferably at least about 1.2, and more preferably at least about 1.4. The exact ratio depends upon the type and amount of oxygen-containing gas used to burn the sulfur.

To obtain good mixing of the gases in the secondary chamber, a plurality of vertical baffles 72 extending alternately up from the bottom wall 65 or down from the top wall 64 are provided. Each baffle 72 is welded to both side walls 62 and either the top wall or the bottom wall and is spaced apart a small distance, in the order of about about 2 to 3 inches, from either the opposing top wall 64 or the opposing bottom wall 65. This provides a tortuous flow path through the secondary chamber as indicated by arrows 74. Moreover, the relatively small clearance between the baffles 72 and either the top wall 64 or the bottom wall 65 causes greatly increased gas velocities adjacent the baffle ends, resulting in turbulent flow in the secondary chamber 18 and intimate mixing of the gas passing therethrough. This insures that substantially all of the unreacted sulfur present in the secondary chamber is combined with oxygen to produce sulfur dioxide.

The gas outlet 68 from the secondary chamber 18 is directly above the sulfurous acid receiving tank 22 and is connected thereto by a short conduit 76 which is provided with a quench water inlet 78. Sulfurous acid 80 is collected in the collection tank 22. There is a gas space 82 in the collection tank 22 above the acid 80. Gas from the secondary chamber 18 passes through the conduit 76, through the air space 82, to enter the base of the absorption tower 20.

The absorbtion tower 20 is a packed tower, having near its bottom a packing support grid 84 (see FIG. 3). The tower is substantially completely filled with packing. A suitable packing comprises 1-inch outer diameter, schedule 125 polyvinylchloride pipe cut into 1-inch lengths randomly loaded into the tower.

Alternatively, the packing can be 1 inch polypropylene saddles in a depth of 5 feet, 3 inches on top of six inches of 1 inch stainles steel pall rings to dissipate the heat.

The tower has a covered access port 85.

With reference to FIGS. 5 and 6, the top of tower 20 is provided with a demister 87 that is supported by four brackets 88 welded to the inside wall of the tower 20. The demister 87 separates any entering liquid from vapor passing out of the top of the absorption tower. A suitable demister is available from Otto H. York Company.

The brackets 88 also support a water distribution assembly 90 that comprises a horizontal plate 92 attached to the underside of the brackets 88. In the center of the plate 92 is a hole 94 in which is mounted an upstanding female threaded section of pipe 96 adapted to receive male threaded plastic pipe 98 which supplies water to the tower 20.

Depending from the plate 92 below the hole 94 supported by three vertical hanger straps 102 is a flat, horizontal perforated plate 104. Surrounding the straps 102 and plate 104 is a cylindrical distribution pipe 108 open at its bottom and attached at its top to the plate 92. The distribution pipe has a plurality of perforations 110, through which the bulk of the water passes. The water distribution assembly 90 insures substantially uniform flow of water through the absorption tower 20.

Altenratively, a spray nozzle available from Spraying Systems of Wheaton, Ill., model 2RR 9545, can be used.

Water for the quench water and for the absorption tower 20 is provided by an inlet pipe 112 that is connected to a T-connector 114. The T-connector distributes water through a valve 116 to a hose 118 connected to the quench water inlet 78. The other side of the T-connector is connected to a valve 120 that is used to control flow of water through a PVC pipe 122 that is connected to the segment of plastic pipe 98 coupled to the water distribution assembly 90.

In a preferred version of the absorption tower, the tower is made of plastic, such as PVC, rather than stainless steel, and the gas inlet is a nozzle that extends into the tower and directs incoming gas downward toward the receiving tank 22. With this configuration, incoming water cools the gas inlet nozzle and helps avoid corrosion. This configuration is not our invention but was disclosed to us in secrecy and confidence and is the invention of William E. Sells, Jr.

The oxygen-containing gas can be any gas that provides free oxygen for combining with sulfur. Preferably, the gas is air, although air enriched with oxygen, or air of reduced oxygen content can be used. The blower 24 supplies the air through a conduit 124 that is connected to the oxygen-containing gas inlet 40 of the primary sulfur-burning chamber 16. A valve 126 is provided in the conduit 124 to control the rate at which oxygen-containing gas is provided to the primary sulfur-burning chamber.

The sulfurous acid removal system comprises the discharge pump 26 that is connected by a hose 128 to the bottom of the sulfurous acid receiving tank 22. There is a valved discharge line 130 from the pump 26. A level control system (not shown) is used to insure that the pump 26 does not withdraw sulfurous acid from the receiving tank 22 at a rate faster than it is generated.

A standpipe 122 is connected to the base of the receiving tank 22 to insure that the absorption tower 20 does not become flooded with liquid. The standpipe 122 can be pivoted to drain the receiving tank 22 during shut-down.

Carbon steel can be used for construction of the sulfurous acid generator 10, although preferably stainless steel is used for components in contact with sulfur dioxide and high heat such as the feed tank, conduits 60, 70 and 76, and the primary and secondary combustion chambers.

The control box 30 is provided with electrical controls for operating the discharge pump 26 and the blower 24. In addition, sensing elements (not shown) are provided to monitor the temperature in the absorption tower, the water pressure of incoming water, and the pH of the sulfurous acid. If the pressure of incoming water is below a set value or if the temperature in the absorption tower becomes too high, the flow of oxygen-containing gas is shut off by shutting down the blower 24.

In operation of the generator 10, sulfur in the primary sulfur-burning chamber 16 is ignited and air is continuously blown into chamber by the blower 24 via the line 124 and the oxygen-containing gas inlet 40. The amount of the air introduced controls the rate of which sulfur is burned up to the maximum capacity of the apparatus 10. At maximum capacity, in the order of about 25 to about 30 pounds of sulfur per square foot of burning surface per hour is burned. About 1 to about 2 CFM (cubic feet per minute) of air per pound of sulfur burned is used.

Thus air is introduced into the primary burner at a rate of at least 25 CFM, and preferably from about 25 to about 60 CFM per square foot of burning surface. At rates higher than about 60 to 65 CFM the flame can be blown out.

The oxygen-containing gas inlet 40 is sized so that the oxygen-containing gas enters the primary chamber at high velocity, preferably at least about 30 feet per second. Preferably, the velocity is less than about 125 feet per second to avoid blowing out the flame.

An advantage of these high velocities is that high sulfur burning rates are achieved because of burn off of carsul. Carsul is a sulfur/cabonaceous material resulting from sulfur combining with carbonaceous materials. Carsul can collect on the surface of the sulfur pool, preventing oxygen from reaching the underlying sulfur, and thereby reducing sulfur burning rates. Because of the use of high air rates the carsul accummulates at the center of the pool where portions rise above the level of the liquid sulfur. This carsul is no longer coated with sulfur, and thus can burn off.

The velocity at which air is introduced into the primary chamber is determined by dividing the rate at which air is introduced (cfm) by the nozzle diameter (sq.ft.).

Preferably, the temperature in the primary chamber is sufficiently high that sulfur in the pool is vaporized. A portion of this vaporized sulfur is burned in the primary chamber in the gas space above the sulfur pool. Effluent gas passes from the primary sulfur-burning chamber 16 via the conduit 70 into the secondary sulfur-burning chamber 18. The effluent gas contains sulfur dioxide, carbon dioxide, oxygen, and unreacted sulfur vapor. In the secondary chamber 18, because of the turbulent flow conditions and long retention time, substantially all of the sulfur in the effluent gas is converted to sulfur dioxide.

The maximum temperature in the secondary burning chamber occurs in the first section 134 that is formed by the first side wall 63A, the top wall 64, the bottom wall 65 and the first baffle 72A. The maximum temperature is at least about 1000° F., and preferably is maintained between about 1000 to 1500 degrees F., and more preferably between about 1300 and 1400 degrees F. When the temperature in the secondary chamber is mentioned herein, reference is being made to the temperature in the first section of the secondary chamber.

The velocity of the inlet gas in the secondary sulfur-burning chamber is at its maximum proximate to the end of the baffles. This velocity preferably is at least about 750 feet per minute to obtain turbulence with resultant oxidation of substantially all of the sulfur present.

Gas passing from the secondary chamber is quenched with quench water introduced through the quench water inlet 78 at a rate of about 0.1 to about 0.15 gallons per minute of water per pound per hour of sulfur burned to prevent damage to the packing in the absorption tower. The rate is varied depending upon the temperature in the secondary chamber 18.

Some sulfur dioxide in the gas withdrawn from the secondary chamber is absorbed in the quench water which is collected in the receiving tank 22. The remainder of the sulfur dioxide is absorbed into water introduced into the top of the absorbtion tower 12 through the distribution assembly 90 as the gas passes upwardly through the tower. Water in the tower is used at a rate of from about 1 to about 2 gallons per minute per pound of sulfur burned per hour.

The sulfur dioxide content of the gas withdrawn from the secondary sulfur-burning chamber 18, prior to the quench, is about 8% to 14% sulfur dioxide by volume, while the gas passing out of the absorbtion tower contains substantially no sulfur dioxide.

Because of the blower 24, the entire system, including the primary and secondary chambers, is under positive pressure.

The apparatus and process of the present invention achieve remarkably high rates of conversion of sulfur to sulfurous acid for the size of the equipment. Sulfur burn rates up to about 30 pounds per hour per square foot of burning surface area have been achieved. Although not bound by theory, it is believed that this is a result of at least three features of the present invention. The first feature is the close coupling of the feed tank 14 with the primary chamber 16, insuring that an adequate supply of molten sulfur is provided to the sulfur pool.

The second feature is the cyclonic, high-velocity gas flow in the primary chamber. This insures that carbon-containing impurities on the surface of the sulfur pool are burned off and that a high proportion of the oxygen introduced into the primary chamber reacts with sulfur. Further, a cyclonic cone is formed, within which vaporized sulfur is oxidized to sulfur dioxide.

The third feature is the use of the secondary sulfur-burning chamber to convert sulfur to sulfur dioxide. Thus, not all the burning is required to occur near the surface of the sulfur pool. The long residence time and tortuous, turbulent flow in the secondary sulfur-burning chamber insure conversion of the sulfur to sulfur dioxide.

A further advantage of the present invention is that it is a compact unit and can fit on a single skid for easy transportation to the field. Moreover, flanges can be included in critical places such as on the conduits to and from the secondary sulfur-burning chamber so that portions of the apparatus especially prone to corrosion can easily be replaced and the generator 10 can be disassembled for transport.

EXAMPLE

An apparatus according to the present invention has a primary sulfur-burning chamber with a diameter of 15½ inches (sulfur surface area of 1.27 square feet) and an oxygen-containing gas inlet nozzle of 2 inches. The conduit 60 from the feed tank 14 was 10 inches long, 5 inches tall, and 15½ inches wide. Sulfur was burned at the rate of 35 pounds per hour with ambient-temperature air introduced at the rate of 65 CFM. Ambient-temperature quench water was provided at the rate of about 5 gallons per minute, and ambient-temperature water was introduced to the top of the absorbtion tower at a rate of about 50 gallons per minute. The secondary sulfur-burning chamber was 2 feet 8 inches long, 1 foot 5 inches tall, and 6 inches wide. The baffles were spaced apart 2 inches from the opposing top or bottom wall, providing a 2-inch clearance for passage of gas through the chamber. The temperature in the first section 134 of the secondary sulfur-burning chamber was about 1350 degrees F.

The top of the absorbtion tower was about 6 feet 8 inches from the top of the skid, and the top of the collection tank was 1 foot 8 inches from the top of the skid. The diameter of the absorbtion tower was about 15 inches.

Although the present invention has been described in considerable detail with reference to certain preferred versions thereof, other versions are possible. For example, the elongated secondary chamber can be vertically oriented rather than horizontally oriented. In addition, the absorption tower and quench do not have to be part of the system. The sulfur dioxide generated in the primary and secondary sulfur-burning chambers can be used without dissolving it in water.

Furthermore, the spatial orientation of the elements of the sulfurous acid-generating system 10 can be changed. Therefore, the spirit and scope of the appended claims should not necessarily be limited to the description of the preferred versions contained herein.

What is claimed is:

1. Apparatus for burning sulfur with oxygen contained in air comprising:
   (a) a primary sulfur-burning chamber comprising (1) an enclosure adapted to have a pool of molten sulfur therein, (2) a sulfur inlet at a first, lower elevation of the enclosure for feed of sulfur into such a pool, (3) an air inlet at a second, relatively higher elevation of the enclosure above the sulfur inlet for introduction of air tangentially into the primary sulfur-burning chamber, and (4) a gas outlet from the enclosure;
(b) a sulfur feed tank for supplying sulfur to the pool of molten sulfur in the primary chamber, the sulfur feed tank being adapted to receive heat from the primary sulfur-burning chamber for the melting of sulfur in the sulfur feed tank;
(c) a conduit from the sulfur feed tank to the sulfur inlet for transferring sulfur from the sulfur feed tank to the primay sulfur-burning chamber, the cross-sectional area of the conduit being at least 30% of the surface area of the pool;
(d) means for introducing substantially all of the air used for burning the sulfur to the air inlet for burning and vaporizing the sulfur supplied to the pool to form an effluent gas containing sulfur, sulfur dioxide, and oxygen; and
(e) a secondary sulfur-burning chamber having an inlet at a first end thereof and an outlet at a second end thereof, the secondary chamber receiving at its inlet effluent gas containing sulfur, sulfur dioxide, and oxygen discharged from the gas outlet of the primary chamber, the secondary chamber having a tortuous flow path for causing turbulent flow of gas passing therethrough for combustion of substantially all of the sulfur in the effluent gas to sulfur dioxide.

2. The apparatus of claim 1 in which the pool is circular.

3. The apparatus of claim 2 in which the primary chamber comprises an internal skirt, the skirt forming a closed-at-its-top annular region above the air inlet.

4. The apparatus of claim 3 in which the air inlet is substantially diametrically opposite the sulfur feed tank.

5. The apparatus of claim 1 or 4 in which the sulfur inlet and the air inlet are substantially diameterically opposed.

6. The apparatus of claim 1 or 2 in which the conduit cross-sectional area is up to about 40% of the surface area of the pool.

7. Apparatus for generating sulfurous acid comprising:
(a) a primary sulfur-burning chamber comprising (1) an enclosure adapted to have a circular pool of molten sulfur therein, (2) a sulfur inlet at a first, lower elevation of the enclosure for feed of sulfur into such a pool, (3) an air inlet at a second, relatively higher elevation of the enclosure above the sulfur inlet and substantially diametrically opposite the sulfur inlet, (4) a gas outlet in the top of the enclosure, and (5) an internal skirt for forming a closed-at-its-top annular region above the air inlet;
(b) a sulfur feed tank closely coupled to the primary sulfur-burning chamber for supplying sulfur to the pool of molten sulfur in the primary chamber at a rate of at least about 25 pounds per hour per square foot of the surface area of the pool, the sulfur feed tank being substantially diametrically opposite the air inlet, the wall of the sulfur feed tank facing the primary sulfur-burning chamber being flat for receiving heat from the primary sulfur burning chamber for melting of sulfur in the sulfur feed tank, and the bottom portion of the wall of the sulfur feed tank farthest from the primary sulfur chamber sloping inwardly toward the primary sulfur-burning chamber;
(c) a first conduit from the sulfur feed tank to the sulfur inlet of the primary sulfur-burning chamber, the cross-sectional area of the first conduit being about 40% of the surface area of the pool and the length of the first conduit being less than the diameter of the pool;
(d) means for introducing substantially all of the air used for burning the sulfur to the air inlet at a rate of at least about 25 CFM per square foot of the pool of molten sulfur and a velocity of at least about 30 feet per second and less than a rate and a velocity that blows out a flame for burning and vaporizing the sulfur supplied to the pool to form an effluent gas containing sulfur, sulfur dioxide, and oxygen, wherein the air inlet comprises a nozzle oriented to introduce air to the annular regional tangentially and horizontally;
(e) an elongated, horizontally oriented secondary sulfur-burning chamber having an inlet at a first end thereof and an outlet at the opposite end thereof, the secondary chamber receiving at its inlet effluent gas containing sulfur, sulfur dioxide, and oxygen discharged from the gas outlet of the primary chamber, the secondary chamber containing a plurality of baffles extending across the flow path through the secondary chamber creating a tortuous path for flow of gas passing through the secondary chamber for combustion of substantially all of the sulfur in the effluent gas to sulfur dioxide;
(f) a sulfur dioxide absorption tower having a water inlet at the top thereof and a gas inlet at the bottom thereof for countercurrent flow of gas and water therein;
(g) a second conduit between the gas inlet of the absorption tower and the outlet of the secondary sulfur-burning chamber; and
(h) means for introducing water to the absorption tower at the water inlet.

8. The apparatus of claim 1 or 7 including means for maintaining the pressure at the top of the feed tank no less than the pressure in the primary chamber.

9. The apparatus of claim 1 wherein the sulfur feed tank is closely coupled to the primary chamber, the length of the conduit being less than the equivalent diameter of the pool.

10. The apparatus of claim 1 in which the width of the conduit is about equal to the equivalent diameter of the pool.

11. The apparatus of claim 1 in which the conduit cross-sectional area is about 40% of the surface area of the pool.

12. The apparatus of claim 1 in which the air inlet introduces air horizontally.

13. The apparatus of claim 1 in which the secondary chamber contains a plurality of baffles and wherein the flow path includes portions of reduced cross-sectional area at the ends of the baffles.

14. The apparatus of claim 1 in which the sulfur feed tank has a flat wall facing the primary sulfur-burning chamber.

15. The apparatus of claim 1 or 14 in which the bottom portion of the wall of the sulfur feed tank farthest from the primary sulfur-burning chamber is flat and slopes inwardly toward the primary sulfur-burning chamber.

16. An apparatus for burning sulfur with oxygen contained in air comprising:
(a) a primary sulfur-burning chamber comprising (1) an enclosure adapted to have a pool of molten sulfur therein, the pool having a surface area, (2) a sulfur inlet at a first, lower elevation of the enclosure for feed of sulfur into such a pool, (3) an air inlet at a second, relatively higher elevation of the enclosure above the sulfur inlet for introducing air tangentially into the primary sulfur burning chamber, the air inlet being diametrically opposite the sulfur inlet, and (4) a gas outlet from the enclosure;

(b) a sulfur feed tank for supplying sulfur to the pool of sulfur in the primary chamber, the sulfur feed tank having a flat wall facing the primary sulfur-burning chamber for receiving heat from the primary sulfur-burning chamber for melting of sulfur in the sulfur feed tank, and wherein the bottom portion of the wall of the sulfur feed tank farthest from the primary sulfur-burning chamber is flat and slopes inwardly toward the primary sulfur-burning chamber, the sulfur feed tank being substantially diametrically opposite the air inlet;

(c) a conduit from the sulfur feed tank to the sulfur inlet for transferring sulfur from the sulfur feed tank to the primary sulfur-burning chamber, the cross-sectional area of the conduit being at least 30% of the surface area of the pool;

(d) means for introducing air used for burning the sulfur to the air inlet for burning and vaporizing the sulfur supplied to the pool to form an effluent gas containing sulfur, sulfur dioxide, and oxygen; and (e) a tortuous flow path secondary sulfur-burning chamber having an inlet at a first end thereof and an outlet at a second end thereof, the secondary chamber receiving at its inlet effluent gas containing sulfur, sulfur dioxide and oxygen discharged from the gas outlet of the primary chamber, substantially all of the sulfur in the effluent gas being combusted to sulfur dioxide in the secondary chamber.

17. A continuous process for producing sulfur dioxide by burning sulfur with oxygen contained in air comprising the steps of:

(a) melting sulfur in a sulfur melting zone;

(b) feeding molten sulfur from the sulfur melting zone into a molten pool of sulfur in a primary sulfur-burning zone at a rate of at least 25 pounds of sulfur per hour per square foot of surface area of the pool, the sulfur being fed to the pool through a conduit, the cross-sectional area of the conduit being at least 30% of the surface area of the pool;

(c) introducing substantially all of the air used for burning the sulfur into the primary zone tangentially under turbulent flow conditions (i) for burning sulfur at the surface of the molten pool with a flame being present, (ii) for vaporizing sulfur from the pool to form an effluent gas stream containing sulfur, sulfur dioxide, and unreacted oxygen, and (iii) for melting sulfur in the sulfur melting zone, the air being introduced at a rate sufficiently high for burning and vaporizing the sulfur fed to the pool and at a rate sufficiently low as to not blow out the flame;

(d) passing the effluent gas stream to a turbulent flow, tortuous flow path secondary sulfur-burning zone for combustion of substantially all of the sulfur in the effluent gas to sulfur dioxide, the effluent gas stream undergoing turbulent flow in the secondary zone; and (e) withdrawing gas containing sulfur dioxide from the secondary zone;

wherein substantially all of the heat for melting sulfur in the melting zone is from burning sulfur in the primary and secondary sulfur-burning zone.

18. The process of claim 17 in which the secondary sulfur-burning zone is maintained at a temperature of at least about 1000° F.

19. The process of claim 17 in which the secondary sulfur-burning zone is maintained at a temperature of from about 1000° to about 1500° F.

20. The process of claim 17 in which air is introduced into the primary zone at a velocity of less than about 125 feet per second.

21. The process of claim 17 in which air is introduced into the primary zone at a rate of less than about 60 CFM per square foot of the pool of molten sulfur.

22. The process of claim 17 in which the pool is circular.

23. The process of claim 17 or 22 in which the conduit cross-sectional area is about 40% of the surface area of the pool.

24. The process of claim 17 or 22 in which the width of the conduit is about equal to the equivalent diameter of the pool.

25. The process of claim 17 in which the sulfur feed tank has a flat wall facing the primary sulfur-burning zone.

26. The process of claim 17 or 25 in which the bottom portion of the wall of the sulfur feed tank farthest from the primary sulfur-burning zone is flat and slopes inwardly toward the primary sulfur-burning zone.

27. The process of claim 17 in which the air is introduced into the primary zone at a location diametrically opposite the location in which the molten sulfur is introduced into the primary zone.

28. The process of claim 17 or 27 in which the air is introduced into the primary zone at a location diametrically opposite the sulfur melting zone.

29. A continuous process for producing sulfurous acid by burning sulfur with oxygen contained in air comprising the steps of;

(a) melting sulfur in a sulfur melting zone;

(b) feeding molten sulfur from the sulfur melting zone into a pool of sulfur in a primary sulfur burning zone at a rate of at least 25 pounds of sulfur per hour per square foot of surface area of the pool, the sulfur being fed to the pool through a conduit, the cross-sectional area of the conduit being about 40% of the surface area of the pool, the length of the conduit being less than the diameter of the pool, and the width of the conduit being about equal to the diameter of the pool, the sulfur melting zone having a flat wall facing the primary sulfur-burning zone, the bottom portion of the wall of the melting zone farthest from the primary sulfur-burning zone sloping inwardly toward the primary sulfur-burning zone;

(c) introducing substantially all of the air used for burning the sulfur into the primary zone under turbulent flow conditions for (i) burning sulfur at the surface of the molten pool with a flame being present, (ii) for vaporizing sulfur from the pool to form an effluent gas stream containing sulfur, sulfur dioxide, and unreacted oxygen, and (iii) for heating sulfur in the sulfur melting zone, the air being introduced at a rate of from about 25 to about 60 CFM per square foot of the pool of molten sulfur, the air being introduced at a location substantially diametrically opposite the location sulfur is fed into the primary sulfur-burning zone and substantially diametrically opposite the sulfur melting zone;

(d) passing the effluent gas stream to a turbulent-flow, tortuous flow path, secondary sulfur-burning zone for combustion of substantially all of the sulfur in the effluent gas to sulfur dioxide at a temperature of from about 1000° to about 1500° F., the effluent gas stream undergoing turbulent flow in the secondary zone; and (e) withdrawing gas containing sulfur dioxide from the secondary zone and contacting the withdrawn gas with water to absorb sulfur dioxide into the water;

wherein substantially all of the heat for melting the sulfur in the sulfur melting zone is from burning sulfur in the primary and secondary sulfur-burning zones.

30. A continuous process for producing sulfur dioxide by burning sulfur with oxygen contained in air comprising the steps of:

(a) melting sulfur in a sulfur melting zone;

(b) feeding molten sulfur from the sulfur melting zone into a molten pool of sulfur in a primary sulfur-burning zone at a rate of at least 25 pounds of sulfur per hour per square foot of surface area of the pool, the sulfur being fed to the pool through a conduit, the cross-sectional area of the conduit being at least 30% of the surface area of the pool, the wall of the sulfur feed tank facing the primary sulfur-burning zone being flat and the bottom portion of the wall of the sulfur feed tank farthest from the primary sulfur-burning zone being flat and sloping inwardly toward the primary sulfur-burning zone;

(c) introducing substantially all of the air used for burning the sulfur into the primary zone tangentially under turbulent flow conditions (i) for burning the sulfur at the surface of the molten pool with a flame being present, (ii) for vaporizing sulfur from the pool to form an effluent gas stream containing sulfur, sulfur dioxide, and unreacted oxygen, and (iii) for melting sulfur in the sulfur melting zone, the air being introduced at a rate sufficiently high for burning and vaporizing the sulfur fed to the pool and at a rate sufficiently low as to not blow out the flame, the air being introduced at a location substantially diametrically opposite the location sulfur is fed into the molten pool and substantially diametrically opposite the sulfur melting zone;

(d) passing the effluent gas stream to a tortuous flow path secondary sulfur-burning zone for combustion of substantially all of the sulfur in the effluent gas to sulfur dioxide; and (e) withdrawing gas containing sulfur-dioxide from the secondary zone;

wherein substantially all of the heat for melting the sulfur is from burning sulfur in the primary and secondary sulfur-burning zones.

* * * * *